No. 735,309.

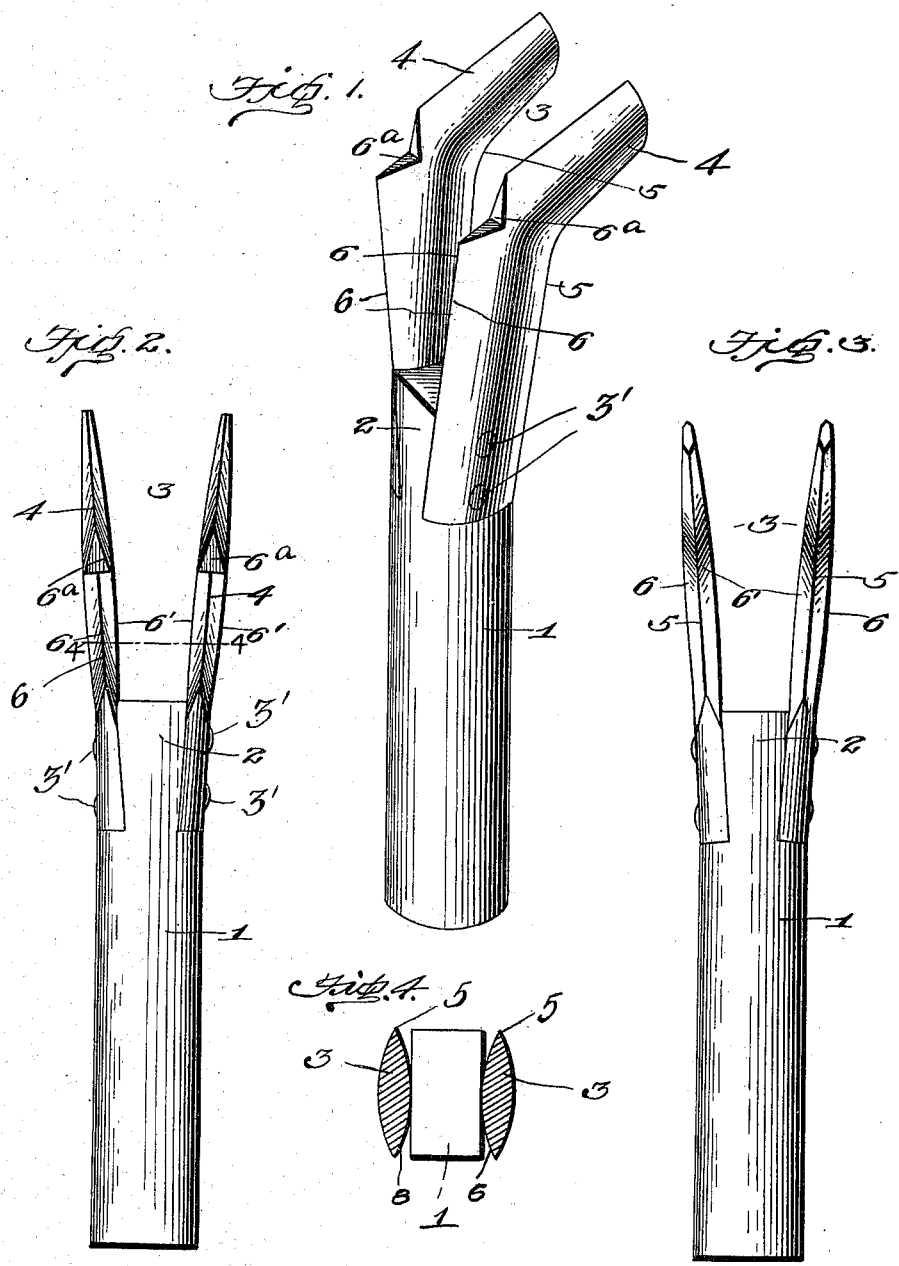

Patented August 4, 1903.

UNITED STATES PATENT OFFICE.

DAVID S. SPURLOCK, OF TYTY, GEORGIA, ASSIGNOR TO N. G. SPURLOCK, OF TYTY, GEORGIA.

CANE-STRIPPER.

SPECIFICATION forming part of Letters Patent No. 735,309, dated August 4, 1903.

Application filed May 5, 1902. Serial No. 106,023. (No model.)

*To all whom it may concern:*

Be it known that I, DAVID S. SPURLOCK, a citizen of the United States, residing at Tyty, in the county of Worth and State of Georgia, have invented certain new and useful Improvements in Cane-Strippers; and I do declare the following to be a full, clear, and exact description of the invention, such as will enable others skilled in the art to which it appertains to make and use the same.

The invention relates to cane-strippers.

The object of the invention is to provide a device of this character which shall be simple of construction, durable in use, comparatively inexpensive of production, and by means of which sugar-cane may be expeditiously stripped of its leaves without liability of cutting into the body of the stalk or into the body of a crossing or interfering stalk and the leaves dragged or moved from the stalk, so as to form no interference in the act of harvesting the cane.

To this end the invention consists of a cane-stripper embodying peculiarities of construction, which will be hereinafter more fully described and particularly pointed out in the appended claims.

In the accompanying drawings, Figure 1 is a perspective view of my improved cane-stripper. Fig. 2 is an edge view of the same. Fig. 3 is a view looking toward the opposite edge, and Fig. 4 is a cross-section through the blades on line 4 4 of Fig. 2.

Referring now more particularly to the drawings, 1 denotes the handle of the stripper, which has a reduced end forming a tenon 2, the sides of which diverge and form abutments for stripping-blades 3, said abutments holding the blades spaced apart and in divergent relation. The inner ends of the blades fit within the recesses on the opposite sides of said tenon and are clamped against the said abutments or divergent sides of the tenon by rivets or like fastenings 3', which pass through the blades and tenon and are headed at their ends to hold the blades firmly in position. By this construction I am enabled to employ rigid or inflexible or semi-inflexible blades while securing the desired divergent relation which is essential in order to obtain a flaring space between the blades to admit cane-stalks of different sizes, so that by an endwise movement of the stripper in a horizontal plane or in a plane at right angles to the stalk the blades may be adjusted upon the stalk to suit the size and taper of the stalk and to avoid or pass irregularities along the length of the stalk during the stripping or cutting operation. Ordinarily the blades of cane-strippers are made thin, flexible, and oppositely bowed or curved to attain the divergent relation, which requires them to be made of tempered spring metal of comparatively high quality, such requirement not only being necessary in order to adapt the blades to preserve their cutting edges and curvature, but also to secure sufficient flexibility to prevent them from snapping when coming in contact with an interfering stone or other hard object in the downward sweep of the stripper in stripping a cane-stalk. By mounting the blades upon the handle in the manner described I not only attain the advantage of being able to use inflexible or semi-inflexible blades without impairing the efficiency of the tool, but may make the blades of low-grade steel of sufficient thickness to be repeatedly sharpened, which may be done without the exercise of any great amount of care or skill, whereas thin steel blades of higher quality when nicked require some skill and care in resharpening and are much more liable to be broken.

It will be observed that each blade 3 is of double convex form in cross-section and that each blade is curved to provide at its free end an obliquely-extending outer hooked end 4. Owing to the double-concaved form of the blades, the blades may be provided with double cutting edges, the convex form of each side thereof giving the requisite thickness to permit of the edges of the convex portions being ground to a sharp edge. One of these cutting edges 5 extends continuously along the concaved side of each blade, so that the straight as well as the hooked portion of the edge 5 may be employed for stripping, while the continuity of the opposite or convex cutting edge 6 is broken or interrupted by a notch 6ª at the point of intersection of the straight portion of the blade with the hooked end thereof. By this construction two sets of cutting edges 5 5 and 6 6 are provided, either of which may be used by a simple reversal of the tool, as will be understood.

In using the device the handle 1 is held in the hand of the operator and the hooked ends of the divergent blades placed upon opposite sides of the cane-stalk, so as to admit the stalk between them. The handle is then thrust forward until the stalk is disposed at the proper point, and then the stripper is moved downwardly along the stalk to strip or cut away the shoots or leaves therefrom at a single operation. After the leaves have been stripped from the stalk they may be pulled to one side and out of the way by the hook-shaped ends 4 of the blades.

In cutting shoots or leaves which are higher than the operator's head the cutting-surfaces 5 of the hooked ends 4 may be employed, and the handle 1 is drawn downwardly, so as to cause said cutting edges to exert a hacking action on the shoot. When the stalk is straight and free from interfering stalks, the cutting edges 5 are used and a straight downward cut exerted to strip the offgrowths from the stalk, the angle of the edges 5, formed by the hooked ends, facilitating the cutting action when the offgrowths are disposed at a low point upon the stalk.

It frequently happens that the stalks, instead of growing straight or vertical, incline or cross or project beyond the contiguous stalks and in which case if the cutting edges 5 are used the concaved surfaces of the hooked ends 4 would catch the interfering or crossing stalk and prevent the downward movement of the stripper or carry the interfering stalk down with it, in which case the interfering stalk would probably be injured by the concaved portions of the edges 5 cutting thereinto. In order to avoid this objection, the cutting edges 6 are provided.

When the stalks are crossed by other stalks, the tool is simply reversed to present the cutting edges 6 downward, and the straight portions of said cutting edges are employed to sever the offgrowths from the stalk. If in the downward movement of the stripper the concaved edges of the hooked ends 4 should come in contact with the crossing or interfering stalk, they would not catch therein and cut the stalk like the concave edges 5, but would, owing to their convexity, act in the nature of cams to press the said interfering stalk outwardly and away from the stalk being trimmed, thus allowing the stripper to pass the interfering stalk and to be moved downward the full length of the stalk from which shoots are being removed. As before stated, the concaved edges of the hooked ends are useful for raking or pulling out the stripped leaves from around the bottom of the stalk and for hacking off leaves higher than the operator's head. They may also be employed for hacking off any particularly stubborn offshoots disposed at any point along the length of the stalk.

The purpose of the notches $6^a$, which separate the cutting edges 6 from the convex edges of the hooks 4, is to form stops to prevent the tool from riding off a shoot which is being cut under a vigorous down movement of the stripper and coming in contact with the person of the operator. It will be understood that when the straight cutting edges 6 are being used for removing the leaves when an interfering stalk is encountered unless the stripper is carefully guided during its downward movement on the stalk the tendency of the tool under the swing of the arm of the operator to move rearwardly or toward the operator out of a straight path is liable to bring the cutting edges 6 out of contact with an underlying leaf or offshoot and to thus throw the stripper rearwardly, so that under ordinary conditions the cutting edges might come in contact with and injure the operator. By the provision of the notches $6^a$ this objection is avoided, as immediately upon the cutting edges 6 moving out of contact with any leaves or offshoots the notches $6^a$ will receive said leaves or offshoots and the outer shoulders thereof will serve as stops to catch into the leaves and prevent the stripper from moving outwardly or away from the stalk. This retention or stoppage of movement of the stripper, which may be only temporary, will enable the operator to regain control of the stripper and to place it in position for further operation for severing the underlying shoots or leaves. By the use of the notches $6^a$ the further advantage is attained of permitting the convex edges of the hooks 4 to be made blunt or to present a noncutting surface, so that they will not cut or otherwise injure an interfering stalk when in the act of pressing the same aside from the stalk being operated upon and out of the path of the tool.

It will be seen that owing to the convexity of the inner faces of the blades each blade has a contact-surface which is rounded on an arcuate curve, the greatest extension of which is at a point midway between the cutting edges, and that the outer faces of the blades are rounded in like manner, so that the two convex faces of each blade practically merge into the inner and outer beveled cutting edges 5 and 6, whereby the convexed faces of the blades serve as guides to enable the said cutting edges to be readily and conveniently sharpened, even by unskilled hands. As a further result of this construction the convexed inner faces of the blades which move in direct contact with the stalk constitute guides which adapt the stripper to be tilted or rocked upon the stalk to accommodate the blades to irregularities thereof and guide the acting cutting edges to prevent them from cutting into the body of the stalk.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim is—

1. A cane-stripper comprising a handle having stripping-blades provided with cutting edges and with convex inner faces, whereby the stripper is adapted to tilt or rock upon a cane-stalk to accommodate the blades to irregularities thereof, and thereby guide the blades to prevent them from cutting into the body of the stalk, substantially as described.

2. A cane-stripper comprising a handle carrying stripping-blades provided with hooked ends, both edges of each blade being sharpened to form cutting edges, whereby the stripper is adapted to be reversed to use either set of cutting edges under different conditions, as described, the inner faces of the blades being convexed or rounded on an arcuate curve, the greatest extension of which is at a point midway between the cutting edges, the ends of said convexed faces merging into the inner beveled surfaces of the cutting edges, whereby, in the use of either set of cutting edges, the stripper is adapted to tilt or rock upon the cane-stalk to accommodate the blades to irregularites thereof and guide the acting cutting edges to prevent them from cutting into the body of the stalk, substantially as described.

3. A cane-stripper comprising a handle having diverging abutments, stripping-blades bearing against said abutments and held in divergent relation thereby, and means for securing the blades in contact with said abutments, substantially as described.

4. A cane-stripper comprising a handle carrying rigid or inflexible stripping-blades, said blades being cross-sectionally of double convex form, and each blade having each of its edges beveled by its double convexity to a cutting edge, the inner convex surfaces of the blades forming also common guiding-surfaces for the two sets of cutting edges, substantially as described.

5. A cane-stripper comprising a handle carrying blades provided with hooked ends, the edges of the blades being sharpened to form two sets of cutting edges, the cutting edges being continuous along the concaved edges of the blades and broken or interrupted contiguous to the hooked ends on the convex edges of the blades, substantially as described.

6. A cane-stripper comprising a handle provided with a tenon having divergently-inclined sides, divergent blades fitting against the inclined sides of the tenon and secured to said tenon, said blades being of double convex form in cross-section and provided with hooked ends, the bevels of the convex surfaces forming each edge of each blade into a cutting surface, and the inner convex surfaces of the blades forming tilting or rocking surfaces to accommodate the blades to irregularities in the stalk and prevent the cutting edges of the blades from cutting into the body of the stalk, substantially as described.

In testimony whereof I have hereunto set my hand in presence of two subscribing witnesses.

DAVID S. SPURLOCK.

Witnesses:
W. A. NIPPER,
IRWIN WILLIS.